United States Patent [19]
Weir et al.

[11] Patent Number: 6,110,557
[45] Date of Patent: Aug. 29, 2000

[54] VERTICAL-MAGNETIC-RECORDING MEDIUM WITH BARIUM FERRITE MAGNETIC LAYER

[75] Inventors: Richard D. Weir; Carl W. Nelson, both of Fremont, Calif.

[73] Assignee: Titanium Memory Systems, Inc., Fremont, Calif.

[21] Appl. No.: 09/255,597

[22] Filed: Feb. 22, 1999

[51] Int. Cl.$^7$ ....................................................... B32B 3/02
[52] U.S. Cl. ..................... 428/65.5; 204/192.1; 427/131; 427/132; 428/693; 428/694 ST; 428/697; 428/699; 428/701; 428/702; 428/900
[58] Field of Search .................................. 428/65.5, 693, 428/694 R, 697, 699, 701, 702, 900, 694 ST; 204/192.1; 427/131, 132

[56] References Cited

PUBLICATIONS

Hasunuma, et al. "Preparation of Barium Ferrite Films With Perpendicular Magnetic Anisotropy by DC Sputtering", IEEE Trans. Magn. MAG–17, No. 6; pp. 3184–3186 (1981). (No Month Avail.).
Matsuoka, et al. "Formation of Ba–Ferrite Films With Perpendicular Magnetization By Targets–Facing Type of Sputtering", IEEE Trans. Magn. MAG–18, No. 6; pp. 1119–1121 (1982) (No Month Avail.).
Matsuoka, et al. "Preparation of Ba–Ferrite Films For Perpendicular Magnetic Recording By RF Targets Facing Type of Sputtering", IEEE Trans. Magn. MAG–20, No. 5; pp. 800–802 (1984). (No Month Avail.).
Morisako, et al. "Ba–Ferrite Films Prepared by RF Diode Sputtering" LEEE Transl. J. Magn. Japan; vol. TJMJ–1, No. 1; Apr. 1985; pp. 39–40.
Matsuoka, et al. "Sputtered Ba–Ferrite Thin Film Disk" IEEE Transl. J. Magn. Japan; vol. TJMJ–1, No. 1; Apr. 1985; pp. 44–45.
Matsuoka, et al. "Ba–Ferrite Thin–Film Disk For Perpendicular Magnetic Recording" J. Appl. Phys. 57(1); Apr. 15, 1985; pp. 4040–4042.
Matsuoka, et al. "Sputter Deposition And Read/Write Characteristics of Ba–Ferrite Thin Film Disk" IEEE Trans. Magn.; vol. MAG–21, No. 5; Sep. 1985; pp. 1474–1476.
Morisako, et al. "e–Axis Orientation of Hexagonal Ferrite Films Prepared by RF Diode Sputtering" J. Magn. Magn. Mater. 54–57 (1986) 1657–1658. (No Month Avail.).
Morisako, et al. "Ba–Ferrite Thin Film Rigid Disk For High Density Perpendicular Magnetic Recording" IEEE Trans. Magn.; vol. MAG–22, No. 5, Sep. 1986; pp. 1146–1148.
Morisako, et al. "Influences Of Sputtering Gas Pressure On Microtexture And Crystallographic Characteristics Of Ba–Ferrite Thin Films For High Density Recording Media" IEEE Trans. Magn.; vol. MAG–23, No. 1, Jan. 1987; pp. 56–58.
Morisako, et al. "Read/WRite Characteristics Of Ba–Ferrite Sputtered Disk" IEEE Trans. Magn., vol. MAG–23, No. 5, Sep. 1987; pp. 2359–2361.
Morisako, et al. "The Effect Of Oxygen Gas Pressure On Ba–Ferrite Sputtered Films For Perpendicular Magnetic Recording Media" IEEE Trans Magn., vol. MAG–24, No. 6, Nov. 1988; pp. 3024–3026.
Speliotis "Digital Recording Performance of Ba–Ferrite Media" J. Appl. Phys. 61 (8), Apr. 15, 1987; pp. 3878–3880.

(List continued on next page.)

*Primary Examiner*—Bernard Pianalto
*Attorney, Agent, or Firm*—Limbach & Limbach, LLP

[57] ABSTRACT

A very-high-performance ultrahigh-density vertical-magnetic-recording disk and associated method of manufacture is disclosed. The magnetic-recording disk has a rigid disk-shaped substrate composed of a titanium alloy or an austenitic stainless steel, an iron oxide layer overlying one or both surfaces of the substrate, and a barium ferrite layer overlying the iron oxide layer. The iron oxide and barium ferrite layers are applied by high-radiofrequency sputtering with high-radiofrequency substrate biasing.

15 Claims, 1 Drawing Sheet

OTHER PUBLICATIONS

Speliotis "Distinctive Characteristics Of Barium Ferrite Media" IEEE Trans. Magn., vol. MAG–23, No. 5, Sep. 1987; pp. 3143–3145.

Speliotis "Overwrite Modulation In Ba–Ferrite Particulate Media" J. Appl. Phys. 63 (8) Apr. 15, 1988; pp. 3429–3431.

Speliotis "Magnetization Reversal In Ba–Ferrite Particulate Media" J. Appl. Phys. 63 (8) Apr. 15, 1988; pp. 3432–3434.

Speliotis "Anisotropy Fields Of Ba–Ferrite And Other Particulate Media" IEEE Trans. Magn., vol. 24, No. 6, Nov. 1988; pp. 2850–2855.

Speliotis "High Density Recording On Particulate And Thin Film Rigid Disks" IEEE Trans. Magn., vol. 25, No. 5, Sep. 1989; pp. 4048–4050.

Speliotis "Criteria For High Density Magnetic Recording Media" J. Magn. Soc. Japan, vol. 13, Supplement No. S1 (1989); pp. 351–356. (No Month Avail).

Speliotis "Vector Magnetization Of recording Media" J. Magn. Soc. Japan, vol. 13, Supplement No. S1 (1989); pp. 887–892. (No Month Avail.).

Speliotis "Corrosion Of Particulate And Thin Film Media" IEEE Trans. Magn, vol. 26, No. 1; Jan. 1990; pp. 124–126.

Speliotis "Isolated Pulses In Particulate And Thin Film Media" IEEE Trans. Magn, vol. 26 No. 1, Jan. 1990; pp. 141–143.

Speliotis "Peak Shift In Particulate And Thin Film Media" J. Magn. Magn. Mater 83 (1990) pp. 455–456. (No Month Avail.).

Speliotis "Anisotropy Field Dispersion In Recording Media" IEEE Trans. Magn, vol. 26, No. 5, Sep. 1990; pp. 1891–1893.

Tsutsumi, et al. "Read/Write Simulation Of Ba–Ferrite Particulate Media" J. Appl. Phys. 69 (8), Apr. 15, 1991; pp. 4493–4495.

Speliotis "Magnetic Interactions In Particulate And Thin–Film Recording Media" J. Appl. Phys. 69 (8), Apr. 15, 1991; pp. 4496–4498.

Sin "Preparation And Characterization Of Thin Films Of M–Type Barium Ferrite On Microcrystalline Carbon Substrates With Diffusion Barrier Sublayers" J. Appl. Phys. (10), May 15, 1993; pp. 6689–6691.

VERTICAL-MAGNETIC-RECORDING MEDIUM WITH BARIUM FERRITE MAGNETIC LAYER

BACKGROUND OF THE INVENTION

1. Field of the Invention

This invention relates generally to magnetic-recording media, and relates more particularly to a vertical-magnetic-recording disk having a high-permeability layer (preferably iron oxide) and a permanent-magnet ferrimagnetic layer (preferably barium ferrite) on a titanium alloy or austenitic stainless steel substrate.

2. Description of the Relevant Art

The preparation by sputtering of barium ferrite films without and with an underlying iron oxide film for the application of vertical-magnetic-recording disks has been carried out by M. Naoe and coworkers at Tokyo Institute of Technology, Tokyo Institute of Polytechnics, and Shinshu University in Japan. This work has been described in a series of technical papers as follows: M. Naoe, S. Hasunuma, Y. Hoshi, and S. Yamanaka, IEEE Trans. Magn. MAG-17, 3184 (1981); M. Matsuoka, Y. Hoshi, M. Naoe, and S. Yamanaka, IEEE Trans. Magn. MAG-18, 1119 (1982); M. Matsuoka, Y. Hoshi, M. Naoe, and S. Yamanaka, IEEE Trans. Magn. MAG-20, 800 (1984); A. Morisako and M. Matsumoto, IEEE Transl. J. Magn. Japan TJMJ-1, 39 (1985); Y. Matsuda, M. Matsuoka, M. Naoe, and Y. Hoshi, IEEE Transl. J. Magn. Japan TJMJ-1, 41 (1985); M. Matsuoka, M. Naoe, and Y. Hoshi, IEEE Transl. J. Magn. Japan TJMJ-1, 44 (1985); M. Matsuoka, M. Naoe, and Y. Hoshi, J. Appl. Phys. 57, 4040 (1985); M. Matsuoka, M. Naoe, and Y. Hoshi, IEEE Trans. Magn. MAG-21, 1474 (1985); A. Morisako, M. Matsumoto, and M. Naoe, J. Magn. Magn. Mater. 54–57, 1657 (1986); A. Morisako, M. Matsumoto, and M. Naoe, IEEE Trans. Magn. MAG-22, 1146 (1986); A. Morisako, M. Matsumoto, and M. Naoe, IEEE Trans. Magn. MAG-23, 56 (1987); A. Morisako, M. Matsumoto, and M. Naoe, IEEE Trans. Nagn. MAG-23, 2359 (1987); A. Morisako, M. Matsumoto, and N. Naoe, IEEE Trans. Magn. MAG-24, 3024 (1988); A. Morisako, M. Matsumoto, and M. Naoe, J. Magn. Soc. Japan 15, 401 (1991); A. Morisako, H. Nakanishi, M. Matsumoto, and M. Naoe, J. Appl. Phys. 75, 5969 (1994); A. Morisako, M. Matsumoto, and M. Naoe, J. Appl. Phys. 79, 4881 (1996). Also of note is A. Morisako, M. Matsumoto, and T. Yamasaki, J. Magn. Soc. Japan 22, 194 (1998), which pertains to the preparation of sputter-deposited strontium ferrite ($SrFe_{12}O_{19}$) films for vertical magnetic recording.

In the first of the above-listed references, the substrate material is silica [silicon dioxide ($SiO_2$)] glass (commonly called fused quartz). In the second reference, not only is this substrate material used, but also others: (1) single-crystal silicon (Si) wafer with (100) orientation, (2) thermally oxidized single-crystal silicon (Si) wafer [with (100) orientation] by which an outer conversion layer of silica ($SiO_2$) glass is formed, and (3) single-crystal sapphire [aluminum oxide ($Al_2O_3$)] with (102) orientation. In all the remaining references, only thermally oxidized single-crystal silicon wafers are used as the substrate material. The fourth and eighth references give the thickness of the thermally oxidized layer of silica ($SiO_2$) glass as 5000 Å (or 500 nm=0.5 $\mu$m) on the single-crystal silicon (Si) wafer.

These materials are not practical for disk substrates in magnetic-recording applications because of their fragility and very expensive fabrication.

Furthermore, aluminum oxide ($Al_2O_3$), as single-crystal sapphire or alumina ceramic, and silicon dioxide ($SiO_2$), as silica glass or single-crystal quartz, are excellent electrical insulators. In disk-coating sputtering systems designed for fabricating magnetic-recording media, in which deposition takes places on both disk sides simultaneously, electrical-insulating disk substrates cannot be bias sputtered during deposition. Substrate bias sputtering is a convenient and powerful technique for controlling film morphology, but its use is precluded with electrical-insulating disk substrates in these systems.

D. E. Speliotis, Advanced Development Corp. (Burlington, Mass.), in 1990 proposed the use of silicon carbide ceramic as a material for disk substrates with sputtered vertical-magnetic-recording media of barium ferrite. Since that time, several people in the magnetic-recording industry have adopted this proposal, but have not yet produced any results. Pure silicon carbide (SiC) is an electrical insulator. However, with appropriate doping semiconductor behavior is obtained and the electrical resistivity can vary over a range of seven orders of magnitude.

In the period over 1987–1991, D. E. Speliotis and coworkers investigated and reported the magnetic-recording performance of media comprised of powder dispersions of barium ferrite crystallite platelet particulates in polymer plastic binders (so-called particulate media). The references are as follows: D. E. Speliotis, J. Appl. Phys. 61, 3878 (1987); D. E. Speliotis, IEEE Trans. Magn. MAG-23, 3143 (1987); D. E. Speliotis, J. Appl. Phys. 63, 3429 (1988); D. E. Speliotis, J. Appl. Phys. 63, 3432 (1988); D. E. Speliotis, IEEE Trans. Magn. MAG-24, 2850 (1988); D. E. Speliotis, IEEE Trans. Magn. MAG-25, 4048 (1989); D. E. Speliotis, J. Magn. Soc. Japan 13(S1), 351 (1989); D. E. Speliotis, J. Magn. Soc. Japan 13(S1), 887 (1989); D. E. Speliotis, IEEE Trans. Magn. MAG-26, 124 (1990); D. E. Speliotis, IEEE Trans. Magn. MAG-26, 141 (1990); D. E. Speliotis, J. Magn. Magn. Mater. 83, 455 (1990); D. E. Speliotis, IEEE Trans. Magn. MAG-26, 1891 (1990); M. Tsutsumi, F. Kugiya, N. Kodama, M. Suzuki, M. Koizumi, F. Akagi, and D. E. Speliotis, J. Appl. Phys. 69, 4493 (1991); and D. E. Speliotis and W. Lynch, J. Appl. Phys. 69, 4496 (1991).

D. E. Speliotis is among the investigators in a technical paper describing the sputtering of barium ferrite films deposited on several different kinds of substrates: (1) thermally oxidized single-crystal silicon (Si) wafers by which an outer conversion layer of silica ($SiO_2$) glass is formed, (2) microcrystalline (vitreous) carbon (a-C), (3) high-radiofrequency-sputtered coating of amorphous silicon nitride ($Si_3N_4$) on vitreous carbon, and (4) high-radiofrequency-sputtered coating of amorphous silicon dioxide ($SiO_2$) on vitreous carbon. The reference is as follows: K. Sin, J. M. Sivertsen, J. H. Judy, Y. Hoshi, and D. E. Speliotis, J. Appl. Phys. 73, 6689 (1993).

The additional materials described above for disk substrates are, too, not practical because of their fragility and very expensive fabrication.

SUMMARY OF THE INVENTION

In accordance with the illustrated preferred embodiment, the present invention is a very-high-performance ultrahigh-density vertical-magnetic-recording disk and associated method of manufacture.

The magnetic-recording disk has a rigid disk-shaped substrate composed of a titanium alloy or an austenitic stainless steel, a high-permeability layer overlying one or both surfaces of the substrate, and a permanent-magnet ferrimagnetic layer overlying the iron oxide layer. Preferably, the substrate has a surface hardened by plasma nitriding, plasma carburizing, or plasma carbonitriding, or by application of a hard coating. Also preferably, the high-permeability layer is sputter-deposited high-permeability ferrimagnetic diiron trioxide or iron(III) oxide (common names: ferric oxide and iron sesquioxide, and mineral name: maghemite) ($\gamma$-$Fe_2O_3$) having a spinel-type crystal structure, and the permanent-magnet ferrimagnetic layer is sputter-deposited permanent-magnet ferrimagnetic barium ferrite [or in the International Union of Pure and Applied Chemistry (IUPAC) nomenclature: barium dodecairon nonadecaoxide or barium dodecairon(III) oxide] ($BaFe_{12}O_{19}$) having a magnetoplumbite-type crystal structure with crystallites having c-axis oriented substantially perpendicular to the surface of the substrate. A protective overlayer overlying the permanent-magnet ferrimagnetic layer is also preferred, which may be composed of titanium diboride ($TiB_2$).

In the reference: A. Morisako, H. Nakanishi, M. Matsumoto, and M. Naoe, J. Appl. Phys. 75, 5969 (1994), sputter-deposited layers of solid solutions of the components: barium ferrite ($BaFe_{12}O_{19}$) and lead ferrite ($PbFe_{12}O_{19}$), both having the magnetoplumbite-type crystal structure, on thermally oxidized single-crystal silicon wafer substrates, are described. The crystallographic characteristics and magnetic properties of these solid-solution layers were investigated. When deposited at optimum substrate temperatures between 480° C. and 550° C., the crystallites are very nearly all perfectly orientated perpendicularly to the substrate plane with the c-axis dispersion angle $\Delta\theta_{50}$ within 1°. The simple barium ferrite, when deposited at optimum substrate temperatures between 550° C. and 620° C., results in the c-axis dispersion angle $\Delta\theta_{50}$ of 3°.

The common name of permanent-magnet ferrimagnetic $PbFe_{12}O_{19}$ is lead ferrite and the mineral name is magnetoplumbite; in the IUPAC nomenclature $PbFe_{12}O_{19}$ is lead dodecairon nonadecaoxide or lead(II) dodecairon(III) oxide. Actually, $SrFe_{12}O_{19}$, $BaFe_{12}O_{19}$, and $PbFe_{12}O_{19}$ are all isomorphous, and are all permanent-magnet ferrimagnetics. The common name of $SrFe_{12}O_{19}$ is strontium ferrite, and in the IUPAC nomenclature: strontium dodecairon nonadecaoxide or strontium dodecairon(III) oxide.

For the permanent-magnet ferrimagnetic layer, the simple $SrFe_{12}O_{19}$ or $PbFe_{12}O_{19}$, or solid solutions of any two or all three compounds: $SrFe_{12}O_{19}$, $BaFe_{12}O_{19}$, and $PbFe_{12}O_{19}$, may be used in place of the simple $BaFe_{12}O_{19}$.

As alternatives to the simple ferrimagnetic iron(III) oxide ($\gamma$-$Fe_2O_3$) for the high-permeability layer, solid solutions of the components: (1) ferrimagnetic manganese ferrite ($MnFe_2O_4$) and paramagnetic zinc ferrite ($ZnFe_2O_4$), or (2) ferrimagnetic nickel ferrite ($NiFe_2O_4$) and paramagnetic zinc ferrite ($ZnFe_2O_4$), all having the spinel-type crystal structure, may be employed. In the IUPAC nomenclature $MnFe_2O_4$ is manganese diiron tetraoxide or manganese(II) diiron(III) oxide, $NiFe_2O_4$ nickel diiron tetraoxide or nickel (II) diiron(III) oxide, and $ZnFe_2O_4$ zinc diiron tetraoxide or zinc diiron(III) oxide. $ZnFe_2O_4$ is paramagnetic down to the Neel temperature $T_N$ of 9.5 K, below which it is antiferromagnetic. In both the $MnFe_2O_4$—$ZnFe_2O_4$ and $NiFe_2O_4$—$ZnFe_2O_4$ solid-solution systems, the maximum number of Bohr magnetons $\mu_B$ per unit formula [resulting in the maximum saturation magnetization $M_s$ (i.e., the maximum saturation magnetic moment per unit volume)] occurs at the composition of 50 mole percent for each component, i.e., $Mn_{0.5}Zn_{0.5}Fe_2O_4$, corresponding to 48.891 weight percent $MnFe_2O_4$ and 51.109 weight percent $ZnFe_2O_4$, and $Ni_{0.5}Zn_{0.5}Fe_2O_4$, corresponding to 49.296 weight percent $NiFe_2O_4$ and 50.704 weight percent $ZnFe_2O_4$. The Bohr magneton number per unit formula for $Mn_{0.5}Zn_{0.5}Fe_2O_4$ is 7 $\mu_B$ and for $Ni_{0.5}Zn_{0.5}Fe_2O_4$ 5.33 $\mu_B$. Although the former has an advantage over the latter in a higher saturation magnetization, the former has a disadvantage over the latter in a lower electrical resistivity. The latter is then a better choice for higher frequency applications in magnetic recording.

The method of the present invention starts with a rigid disk-shaped substrate composed of a titanium alloy or an austenitic stainless steel, then a high-permeability layer is applied overlying the surface of the substrate, and a permanent-magnet ferrimagnetic layer is applied overlying the high-permeability layer. Preferably, the method includes a step of hardening the surface of the substrate by plasma nitriding, plasma carburizing, or plasma carbonitriding, or by application of a hard coating. Also preferably, the high-permeability layer is high-radiofrequency (13.56 MHz) sputtered onto the hardened surface of the substrate, and is high permeability ferrimagnetic iron(III) oxide ($\gamma$-$Fe_2O_3$) having a spinel-type crystal structure. Preferably, the permanent-magnet ferrimagnetic layer is high-radiofrequency (13.56 MHz) sputtered onto the high-permeability layer, and is permanent-magnet ferrimagnetic barium ferrite ($BaFe_{12}O_{19}$) having a magnetoplumbite-type crystal structure with crystallites having c-axis oriented substantially perpendicular to the surface of the substrate. The method of the present invention also preferably includes a step of applying a protective overlayer of titanium diboride ($TiB_2$) overlying the permanent-magnet ferrimagnetic layer.

Alternatively, for the permanent-magnet layer, the simple $SrFe_{12}O_{19}$ or $PbFe_{12}O_{19}$, or solid solutions of $SrFe_{12}O_{19}$, $BaFe_{12}O_{19}$, and $PbFe_{12}O_{19}$ may be used, and for the high-permeability layer, solid solutions of $MnFe_2O_4$ and $ZnFe_2O_4$ or $NiFe_2O_4$ and $ZnFe_2O_4$ may be used.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWING

The FIGURE is a sectional view of a magnetic-recording medium according to the present invention.

DETAILED DESCRIPTION OF THE PREFERRED EMBODIMENT

Figure 1:
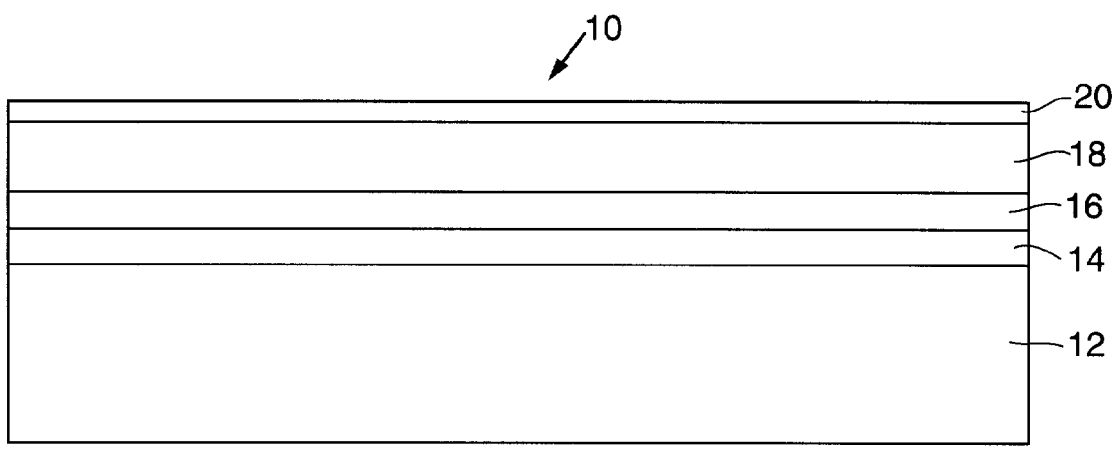

FIG. 1 depicts a preferred embodiment of the present invention for purposes of illustration only. One skilled in the art will readily recognize from the following discussion that alternative embodiments of the structures and methods illustrated herein may be employed without departing from the principles of the invention described herein.

The preferred embodiment of the present invention is a vertical-magnetic-recording medium having a permanent-magnet ferrimagnetic layer of barium ferrite and a high-permeability underlayer of iron oxide on a plasma-nitrided titanium alloy or austenitic stainless steel substrate. The recording medium is a rigid disk suitable for use in hard disk drives.

Alternatively, for the permanent-magnet layer, the simple $SrFe_{12}O_{19}$ or $PbFe_{12}O_{19}$, or solid solutions of $SrFe_{12}O_{19}$, $BaFe_{12}O_{19}$, and $PbFe_{12}O_{19}$ may be used, and for the high-permeability layer, solid solutions of $MnFe_2O_4$ and $ZnFe_2O_4$ or $NiFe_2O_4$ and $ZnFe_2O_4$ may be used.

Very-high-performance ultrahigh-density vertical magnetic recording can be obtained with the use of a sputter-deposited high-permeability ferrimagnetic iron(III) oxide ($\gamma$-$Fe_2O_3$) underlayer and a sputter-deposited permanent-magnet ferrimagnetic barium ferrite ($BaFe_{12}O_{19}$) layer. Both $\gamma$-$Fe_2O_3$ and $BaFe_{12}O_{19}$ are very stable compounds because their cations are in the highest oxidation state, and both are electrical insulators. $MnFe_2O_4$, $NiFe_2O_4$, and $ZnFe_2O_4$ are very stable compounds, and also the solid solutions between and among them; similarly for $SrFe_{12}O_{19}$, $BaFe_{12}O_{19}$, and $PbFe_{12}O_{19}$. For use in vertical magnetic recording, the $\gamma$-$Fe_2O_3$ layer must deposit with the spinel-type crystal structure, and the $BaFe_{12}O_{19}$ layer must deposit with the magnetoplumbite-type crystal structure and with well-oriented crystallites each having its c-axis direction perpendicular to the substrate plane.

In order to deposit these layers so that they are crystalline instead of amorphous, a substrate temperature of between 500° C. and 600° C. is required. In order to optimize the film morphology and hence the magnetic characteristics, an electrically conductive (i.e., metal) substrate is required, so that high-radiofrequency (13.56 MHz) substrate biasing can be used during deposition. Since, too, $\gamma$-$Fe_2O_3$ and $BaFe_{12}O_{19}$ are both electrical insulators, high-radiofrequency power must be applied to both target sputtering and substrate biasing in order to avoid arcing. The other choices, $MnFe_2O_4$, $NiFe_2O_4$, $ZnFe_2O_4$, and solid solutions thereof, and $SrFe_{12}O_{19}$, $BaFe_{12}O_{19}$, $PbFe_{12}O_{19}$, and solid solutions thereof, are electrical insulators, thereby requiring high-radiofrequency power as well.

Arcing occurs from the positive-space-charge buildup on electrical insulating surfaces caused by dc-powered and very-low-, low-, and medium-radiofrequency-powered gas discharges changing from the area-covering volume-filling glow mode used in sputtering to the very-localized very-low-voltage very-high-current-density arc mode. Arcing results in molten material which explosively leaves the surface as droplets showering onto opposite and surrounding areas as particulate matter. In high-radiofrequency-powered gas discharges, this positive-space-charge buildup on an insulator surface cannot occur because electrons from the glow-space region reach the surface to erase the charge each cycle for a comparatively short duration at the most positive part of the waveform, or, in short, at the frequency of the generator.

Austenitic stainless steels and cold-rollable high-strength titanium alloys as a precision-rolled, precision-blanked, super-polished, and plasma-nitrided disk substrate fulfill the requirements for a substrate for this application and at a very much lower cost than other alternative materials and processing thereof. The use of austenitic stainless steels and titanium alloys for rigid disk substrates is disclosed in U.S. Pat. Nos. 5,536,549 and 5,707,705, respectively, which are hereby incorporated by reference.

As shown in FIG. 1, a magnetic-recording disk 10 according to the present invention includes a rigid disk-shaped substrate 12 composed of a titanium alloy or an austenitic stainless steel and having a hardened surface 14.

The hardened surface 14 is one of two types, either a plasma hardened layer or an applied hard material coating. The plasma hardened layer is a surface region of the substrate into which nitrogen and/or carbon atoms have been diffused. Alternatively, the hardened surface 14 is an applied hard material coating of aluminum nitride, silicon nitride, silicon carbide, or a nitride, carbide, or boride of titanium, zirconium, hafnium, vanadium, niobium, tantalum, chromium, molybdenum, or tungsten.

Overlying the hardened layer 14 of the magnetic-recording disk 10 is an iron oxide underlayer 16. The iron oxide layer 16 is sputter-deposited high-permeability ferrimagnetic iron(III) oxide ($\gamma$-$Fe_2O_3$) having a spinel-type crystal structure.

Overlying the iron oxide underlayer 16 is a barium ferrite layer 18. The barium ferrite layer 18 is sputter-deposited permanent-magnet ferrimagnetic barium ferrite ($BaFe_{12}O_{19}$) having a magnetoplumbite-type crystal structure with crystallites having c-axis oriented substantially perpendicular to the surface of the substrate. Overlying the barium ferrite layer 18 is a protective overlayer, preferably composed of titanium diboride ($TiB_2$).

The layers of FIG. 1 are not to scale. Typical thickness dimensions for the component layers would be about 0.25 to 0.80 mm for the substrate 12, about 5 to 30 micrometers for the hardened layer 14 if the substrate surface is hardened by plasma hardening or about 0.5 to 3.0 micrometers if the hardened layer is an applied hard coating, about 0.03 to 0.10 micrometers for the ferrimagnetic iron(III) oxide ($\gamma$-$Fe_2O_3$) underlayer 16, about 0.05 to 1.0 micrometers for the ferrimagnetic barium ferrite ($BaFe_{12}O_{19}$) layer 18, and about 5 to 30 nanometers for the protective overlayer 20.

The magnetic and other layers 14–20 may be on one side of the substrate 12 as shown in FIG. 1, or, more typically, on both sides of the substrate.

The preferred method of making a magnetic-recording disk, according to the present invention, starts by providing a rigid disk-shaped substrate 12 composed of a titanium alloy or an austenitic stainless steel, and then hardening a surface 14 of the substrate. The hardened surface 14 may be formed in either of two ways. One way is to first clean the surface of the substrate 12 by sputter etch cleaning and then harden it by plasma nitriding, plasma carburizing, or plasma carbonitriding. The other way is to apply a hard material coating onto the surface of the substrate 12 to form the hardened layer 14, where the hard material coating is aluminum nitride, silicon nitride, silicon carbide, or a nitride, carbide, or boride of titanium, zirconium, hafnium, vanadium, niobium, tantalum, chromium, molybdenum, or tungsten.

According to the method of the present invention, a layer of iron oxide 16 is sputtered onto the hardened surface of the substrate, and a layer of barium ferrite 18 is sputtered onto the iron oxide layer. The iron oxide layer 16 is high-permeability ferrimagnetic iron(III) oxide ($\gamma$-$Fe_2O_3$) having a spinel-type crystal structure. The barium ferrite layer 18 is permanent-magnet ferrimagnetic barium ferrite ($BaFe_{12}O_{19}$) having a magnetoplumbite-type crystal structure with crystallites having c-axis oriented substantially perpendicular to the surface of the substrate. The method of the present invention also preferably includes a step of sputtering a protective overlayer of titanium diboride ($TiB_2$) overlying the barium ferrite layer. The sputtering operations utilize high radiofrequency (13.56 MHz) for the sputtering targets and biasing of the conductive substrate 12. During sputtering, the substrate has a temperature of preferably between about 500° C. and about 600° C.

Alternatively, for the permanent-magnet layer, the simple $SrFe_{12}O_{19}$ or $PbFe_{12}O_{19}$, or solid solutions of $SrFe_{12}O_{19}$, $BaFe_{12}O_{19}$, and $PbFe_{12}O_{19}$ may be used, and for the high-permeability layer, solid solutions of $MnFe_2O_4$ and $ZnFe_2O_4$ or $NiFe_2O_4$ and $ZnFe_2O_4$ may be used.

From the above description, it will be apparent that the invention disclosed herein provides a novel and advantageous vertical-magnetic-recording medium having a barium ferrite layer and an iron oxide underlayer on a plasma-nitrided titanium alloy or austenitic stainless steel substrate. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A magnetic-recording disk comprising:

a rigid disk-shaped substrate composed of a titanium alloy or an austenitic stainless steel and having a surface;

a high-permeability layer overlying the surface of the substrate, wherein the high-permeability layer is composed of ferrimagnetic iron(III) oxide ($\gamma$-$Fe_2O_3$), or a solid solution of ferrimagnetic manganese ferrite ($MnFe_2O_4$) and paramagnetic zinc ferrite ($ZnFe_2O_4$), or a solid solution of ferrimagnetic nickel ferrite ($NiFe_2O_4$) and paramagnetic zinc ferrite ($ZnFe_2O_4$); and a permanent-magnet ferrimagnetic layer overlying the high-permeability layer, wherein the permanent-magnet ferrimagnetic layer is composed of barium ferrite ($BaFe_{12}O_{19}$), strontium ferrite ($SrFe_{12}O_{19}$), or lead ferrite ($PbFe_{12}O_{19}$), or solid solutions of any two or all three of barium ferrite ($BaFe_{12}O_{19}$), strontium ferrite ($SrFe_{12}O_{19}$), and lead ferrite ($PbFe_{12}O_{19}$).

2. A magnetic-recording disk as recited in claim 1 further comprising a protective overlayer overlying the permanent-magnet ferrimagnetic layer.

3. A magnetic-recording disk as recited in claim 2 wherein the protective overlayer is composed of titanium diboride ($TiB_2$).

4. A magnetic-recording disk as recited in claim 1 wherein the surface of the substrate is first cleaned by sputter etching and then hardened by plasma nitriding, plasma carburizing, or plasma carbonitriding prior to the application of the high-permeability layer.

5. A magnetic-recording disk as recited in claim 1 further comprising a hard material coating on a surface of the substrate, wherein the hard material coating is a material selected from the group consisting of aluminum nitride, silicon nitride, silicon carbide, and nitrides, carbides, and borides of titanium, zirconium, hafnium, vanadium, niobium, tantalum, chromium, molybdenum, or tungsten, and wherein the hard material coating is applied before the high-permeability layer.

6. A magnetic-recording disk as recited in claim 1 wherein the high-permeability layer is applied by sputter deposition.

7. A magnetic-recording disk as recited in claim 6 wherein the high-permeability layer is high-permeability ferrimagnetic iron(III) oxide ($\gamma$-$Fe_2O_3$).

8. A magnetic-recording disk as recited in claim 7 wherein the high-permeability layer has a spinel-type crystal structure.

9. A magnetic-recording disk as recited in claim 1 wherein the permanent-magnet ferrimagnetic layer is applied by sputter deposition.

10. A magnetic-recording disk as recited in claim 9 wherein the permanent-magnet ferrimagnetic layer is permanent-magnet ferrimagnetic barium ferrite ($BaFe_{12}O_{19}$).

11. A magnetic-recording disk as recited in claim 10 wherein the permanent-magnet ferrimagnetic layer has a magnetoplumbite-type crystal structure.

12. A magnetic-recording disk as recited in claim 11 wherein the permanent-magnet ferrimagnetic layer has crystallites with c-axis oriented substantially perpendicular to the surface of the substrate.

13. A magnetic-recording disk comprising:

a rigid disk-shaped substrate composed of a titanium alloy or an austenitic stainless steel and having a hardened surface;

an iron oxide layer overlying the hardened surface of the substrate, wherein the iron oxide layer is sputter-deposited high-permeability ferrimagnetic iron (III) oxide ($\gamma$-$Fe_2O_3$) having a spinel-type crystal structure;

a barium ferrite layer overlying the iron oxide layer, wherein the barium ferrite layer is sputter-deposited permanent-magnet ferrimagnetic barium ferrite ($BaFe_{12}O_{19}$) having a magnetoplumbite-type crystal structure with crystallites having c-axis oriented substantially perpendicular to the surface of the substrate; and a protective overlayer overlying the barium ferrite layer, wherein the protective overlayer is composed of titanium diboride ($TiB_2$).

14. A magnetic-recording disk as recited in claim 13 wherein the surface of the substrate is first clad by sputter etching and then hardened by plasma nitriding, plasma carburizing, or plasma carbonitriding prior to the application of the iron oxide layer.

15. A magnetic-recording disk as recited in claim 13 further comprising a hard material coating on a surface of the substrate, wherein the hard material coating is a material selected from the group consisting of aluminum nitride, silicon nitride, silicon carbide, and nitrides, carbides, and borides of titanium, zirconium, hafnium, vanadium, niobium, tantalum, chromium, molybdenum, or tungsten, and wherein the hard material coating is applied before the iron oxide layer.

* * * * *